(12) United States Patent
Handtrack et al.

(10) Patent No.: US 12,042,853 B2
(45) Date of Patent: Jul. 23, 2024

(54) CASTING INSERT AND PRODUCTION METHOD

(71) Applicant: PLANSEE SE, Reutte (AT)

(72) Inventors: Dirk Handtrack, Reutte (AT); Heinrich Kestler, Reutte (AT)

(73) Assignee: Plansee SE, Reutte (AT)

( * ) Notice: Subject to any disclaimer, the term of this patent is extended or adjusted under 35 U.S.C. 154(b) by 0 days.

(21) Appl. No.: 18/042,322

(22) PCT Filed: Jul. 20, 2021

(86) PCT No.: PCT/AT2021/060253
§ 371 (c)(1),
(2) Date: Feb. 21, 2023

(87) PCT Pub. No.: WO2022/036377
PCT Pub. Date: Feb. 24, 2022

(65) Prior Publication Data
US 2023/0321718 A1    Oct. 12, 2023

(30) Foreign Application Priority Data

Aug. 20, 2020 (AT) ............ GM 50165/2020

(51) Int. Cl.
| | | |
|---|---|---|
| *B22D 17/22* | (2006.01) | |
| *B22D 17/20* | (2006.01) | |
| *B22F 10/10* | (2021.01) | |
| *B22F 10/64* | (2021.01) | |
| *B22F 10/66* | (2021.01) | |
| *B33Y 10/00* | (2015.01) | |

(Continued)

(52) U.S. Cl.
CPC .......... *B22D 17/2218* (2013.01); *B22F 10/10* (2021.01); *B22F 10/64* (2021.01); *B22F 10/66* (2021.01); *B33Y 10/00* (2014.12); *B33Y 80/00* (2014.12); *C22C 27/04* (2013.01); *B22F 2201/013* (2013.01); *B22F 2301/20* (2013.01); *B22F 2998/10* (2013.01); *B22F 2999/00* (2013.01)

(58) Field of Classification Search
CPC ..... B22D 17/20; B22D 17/22; B22D 17/2218
See application file for complete search history.

(56) References Cited

U.S. PATENT DOCUMENTS

| | | |
|---|---|---|
| 2011/0005701 A1 | 1/2011 | Huang |
| 2016/0017724 A1 | 1/2016 | Xu |
| 2017/0246677 A1 | 8/2017 | Bunker et al. |

FOREIGN PATENT DOCUMENTS

| | | |
|---|---|---|
| DE | 102011076312 A1 | 11/2012 |
| DE | 102016003621 A1 | 9/2017 |

(Continued)

*Primary Examiner* — Kevin E Yoon
(74) *Attorney, Agent, or Firm* — Laurence A. Greenberg; Werner H. Stemer; Ralph E. Locher

(57) ABSTRACT

A casting insert includes a casting insert wall formed substantially of a liquid-phase-sintered refractory metal alloy, a cavity formed by the casting insert wall, and at least one cooling duct, which is different from the cavity and which is formed at least partly within the cavity and/or which is formed at least partly within the casting insert wall. The casting insert wall has a wall thickness which can be defined as a normal distance between a point of the casting insert wall which faces the cavity and a point on an outer surface of the casting insert wall. The wall thickness is, at least in sections, less than 25% of a diameter of the casting insert.

15 Claims, 6 Drawing Sheets

(51) Int. Cl.
*B33Y 80/00* (2015.01)
*C22C 27/04* (2006.01)

(56) References Cited

FOREIGN PATENT DOCUMENTS

| | | | |
|---|---|---|---|
| DE | 102019002478 | A1 | 10/2019 |
| EP | 1084779 | A1 | 3/2001 |
| EP | 1293276 | A2 | 3/2003 |
| EP | 3167101 | B1 | 9/2019 |
| WO | 2016004985 | A1 | 1/2016 |
| WO | 2019123938 | A1 | 6/2019 |

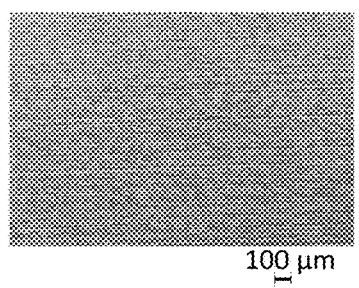 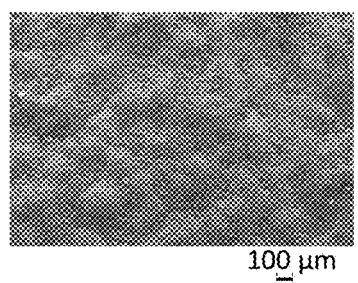 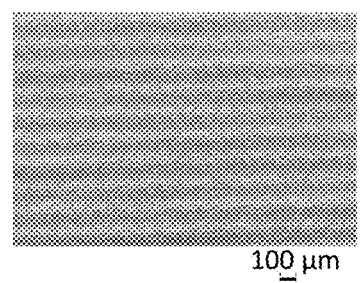
Fig. 8a      Fig. 8b      Fig. 8c
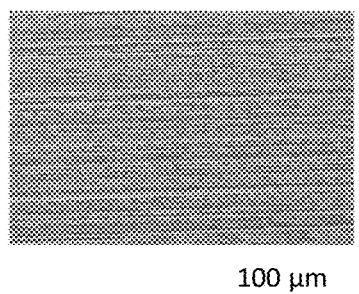 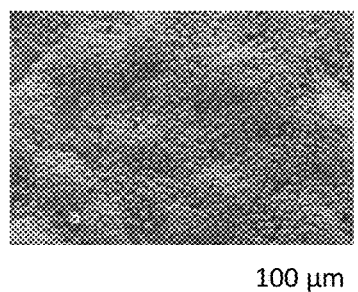 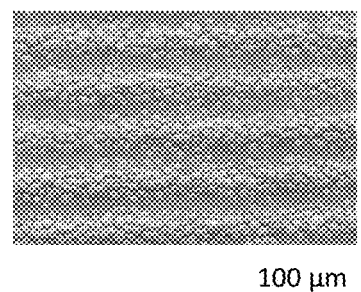
Fig. 9a      Fig. 9b      Fig. 9c
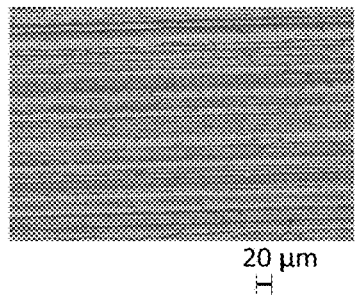 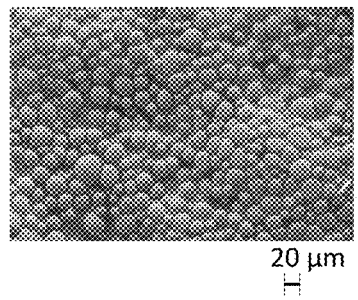 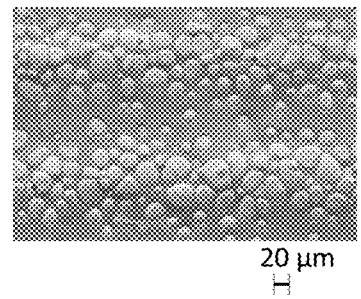
Fig. 10a      Fig. 10b      Fig. 10c
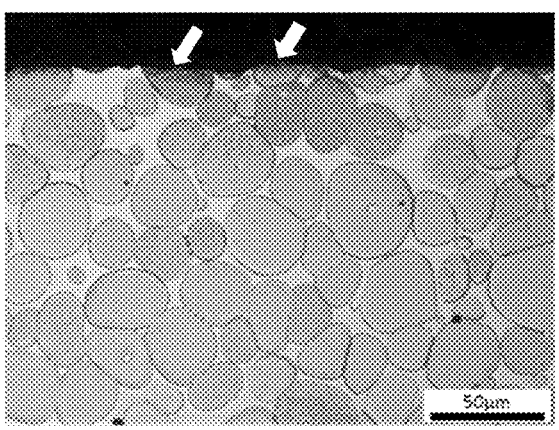 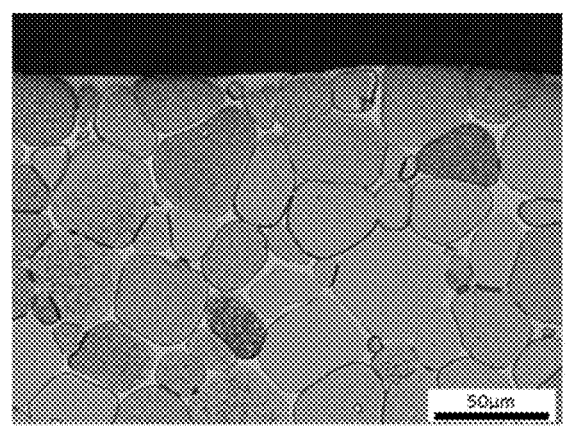
Fig. 11a      Fig. 11b

CASTING INSERT AND PRODUCTION METHOD

FIELD AND BACKGROUND OF THE INVENTION

The present invention relates to a casting insert and to a method for producing a casting insert.

In the context of the present invention, a casting insert is understood to be a component for use with a casting mold, in particular a casting mold for the die casting of metals.

This includes, for example, what are known as inserts, sprue bushes, cooling inserts and core pins.

The components mentioned are distinguished by the fact that they must withstand high erosive and thermal stresses. In particular, casting inserts are used for locally amplified heat removal from a casting component.

While the casting mold itself is generally produced from a hot-work steel, for casting inserts materials are also used that have a higher thermal conductivity than the steels used for casting molds.

For example, casting inserts made from tungsten- or molybdenum-based alloys have been proposed. Suitable in particular are tungsten-heavy metal alloys or TZM molybdenum alloys, due to the high thermal conductivity and the resistance to metal melts.

Casting inserts may be configured for active cooling. To this end, cooling ducts are incorporated in the solid casting insert, via which a coolant can circulate.

According to the prior art, cooling ducts are typically formed by bores. Angled profiles can be achieved by cross bores that are subsequently closed with stoppers. Profiles of cooling ducts that are geometrically more complex can be realized by first introducing recesses into component halves of a casting insert and joining the component halves to form the finished casting insert.

SUMMARY OF THE INVENTION

It is an object of the present invention to specify an improved casting insert and a production method.

In particular, the casting insert and the method are intended to enable a more economical utilization of material. In addition, the intention is to make possible a particularly advantageous dissipation of heat and/or storage of heat.

The object is achieved by a casting insert and by a method as described below.

Advantageous embodiments are defined in the dependent claims.

By the casting insert according to the invention comprising:
- a casting insert wall formed essentially from a liquid-phase-sintered refractory metal alloy,
- a cavity formed by the casting insert wall,
- at least one cooling duct that is different from the cavity and which at least in sections is configured within the cavity and/or which at least in sections is configured within the casting insert wall,
- wherein the casting insert wall has a wall thickness, which wall thickness is defined by a normal distance between a point of the casting insert wall facing the cavity and a point on an outer surface of the casting insert wall, and the wall thickness at least in sections is less than 25% of a diameter of the casting insert, a casting insert is specified which satisfies the thermal, mechanical and chemical requirements while utilizing material in a particularly favorable manner.

The material forming the casting insert wall is referred to as the casting insert wall material.

A cavity formed by the casting insert wall means that in the casting insert according to the invention the casting insert wall forms a shell; the casting insert is therefore not completely pervaded by the material forming the casting insert wall, the casting insert wall material. The casting insert is accordingly a hollow body in which there is at least one cooling duct and optionally a support structure. This does not mean that the casting insert is entirely free of material within the cavity in all exemplary embodiments. Instead, the cavity can be completely or partially pervaded by a fill material which differs from the casting insert wall material.

In all cases, that section that comes into contact with melt during use of the casting insert will have a closed casting insert wall. The portion of the casting insert facing away from this side can in contrast be of open configuration.

Provision is made for the casting insert wall to have a wall thickness that at least in sections is less than 25% of a diameter of the casting insert, preferably in sections less than 20%, more preferably in sections less than 10% of the diameter.

By this it is expressed that the casting insert is thin-walled in configuration. A lower limit for the wall thinness emerges by nature from the requirements for mechanical and/or chemical resistance of the casting insert wall. In particular, the wall thickness is at least 2% of a diameter of the casting insert, more preferably at least 5% of a diameter of the casting insert. Speaking in terms of absolute values, it is preferable for the wall thickness to be at least 1 mm, more preferably to be at least 2 mm.

The wall thickness is definable by a normal distance between a point of the casting insert wall facing the cavity and a point on an outer surface of the casting insert wall.

Preferably, the wall thickness along at least 50%, preferably along at least 80%, of an extent of the casting insert wall in a longitudinal section through the casting insert is less than 25% of the diameter, preferably less than 20% of the diameter, more preferably less than 10% of the diameter, of the casting insert. The longitudinal section for this definition is set so that the wall thickness is displayed in a true-to-distance manner.

According to a further development, the wall thickness on average is less than 25%, preferably on average less than 20%, especially preferably on average less than 10%, of the diameter of the casting insert. Of course, a relatively great wall thickness can be provided locally, but on average a low wall thickness is present.

To evaluate the wall thickness, those sections of the casting insert wall are considered that protrude into a casting mold when the casting insert is being used. In other words, the ratio formation only includes wall thicknesses at those positions of the casting insert wall at which the casting insert wall forms an outer surface with respect to a melt in a situation installed in a casting mold.

Any reinforcements, collars and the like that predominantly serve for reception on the casting mold are not included here.

Likewise not included in the ratio formation is any support structure.

The advantages of a thin-walled nature are firstly that less of the relatively expensive wall material, the refractory metal alloy, needs to be used to form the casting insert. In addition to this economic consideration, with thin walls a greater volume of the casting insert can be filled with a fill material which for example has a particularly suitable thermal conductivity or another property, which property can be exploited to a greater degree with a greater volume proportion than in the case of a thick-walled casting insert with consequently lower volume proportion of fill material.

The configuration according to the invention means that only as much material is used for creating the casting insert wall as is necessary for achieving the required heat dissipation, desired heat storage and for resistance with respect to melts.

This is in contrast to the casting inserts known from the prior art, which are solid. Casting inserts according to the prior art are thus essentially completely pervaded by the material that comes into contact with a melt in use.

The invention allows material-saving manufacture of a casting insert produced in one piece. Advantages of the casting insert compared to the prior art include:
improved heat dissipation, freedom in the implementation of the cooling duct with respect to spatial profile and cross-sectional shape,
cooling only where it is needed,
reduction in the heat storage capacity when using a material with an actually high heat capacity.

In particular, this can achieve a reduction in cycle times in the application (e.g. in die casting, in particular aluminum die casting).

According to the invention, the casting insert wall material is formed essentially from a liquid-phase-sintered refractory metal alloy. The term "essentially" here means that the casting insert wall material consists to an extent of at least 80% by volume (volume percent), preferably to an extent of greater than 90% by volume, more preferably to an extent of greater than 95% by volume, in particular completely, of the liquid-phase-sintered refractory metal alloy.

In the context of the present application, refractory metals are understood to be the metals of group 4 (titanium, zirconium and hafnium), group 5 (vanadium, niobium, tantalum) and group 6 (chromium, molybdenum, tungsten) of the periodic table and also rhenium. Refractory metal alloys are alloys having at least 50 at. % (atom percent) of the element in question.

Of particular relevance are tungsten-heavy metal alloys comprising tungsten with one or more elements from the group nickel, iron, copper, molybdenum, and also liquid-phase-sinterable molybdenum-based alloys comprising molybdenum with one or more elements from the group nickel, iron, copper, tungsten.

The minimum content of tungsten in tungsten-heavy metal alloys or of molybdenum in liquid-phase-sinterable molybdenum-based alloys is preferably at least 85% by weight (weight percent), in particular at least 87% by weight.

The elements are also referred to hereinafter in abbreviated form with the element symbol (W, Mo, Cu, etc.).

Liquid-phase-sintered means that the powder-metallurgical production route for the casting insert was conducted in the presence of molten phase. Associated with this, among other things, is an advantageously low porosity in the casting insert wall material. It should be noted for clarification that in tungsten-heavy metals and liquid-phase-sinterable molybdenum-based alloys typically the tungsten or molybdenum itself is not melted.

The casting insert wall material is accordingly formed by a composite material composed of grains of refractory metal with a binder phase surrounding the grains.

In particular, the following compositions of refractory metal alloys are proposed with preference:

TABLE 1

Examples of suitable tungsten-heavy metal alloys. DENSIMET ® and INERMET ® are registered trademarks of PLANSEE SE.

| Material | Abbreviated designation | W content [% by weight] | Remainder |
|---|---|---|---|
| DENSIMET ® 170 | D170 | 90.5 | Ni, Fe |
| DENSIMET ® 176/W | D176/DW | 92.5 | Ni, Fe |
| DENSIMET ® 180 | D180 | 95.0 | Ni, Fe |
| DENSIMET ® 185 | D185 | 97 | Ni, Fe |
| DENSIMET ® 188 | D188 | 98.5 | Ni, Fe |
| DENSIMET ® D2M | D2M | 90.0 | Ni, Mo, Fe |
| INERMET ® 170 | IT170 | 90.2 | Ni, Cu |
| INERMET ® 176 | IT176 | 92.5 | Ni, Cu |
| INERMET ® 180 | IT180 | 95.0 | Ni, Cu |

The alloys D185 and D2M have proven to be particularly advantageous for use with aluminum melts since they have a low proportion of Fe—Ni binder phase, which is attacked by liquid aluminum.

Likewise suitable are liquid-phase-sinterable refractory metal alloys based on molybdenum. Of particular suitability are molybdenum alloys having contents of around 90% by weight of molybdenum and contents of nickel in the range between 3% by weight and 7% by weight, copper between 1% by weight-6% by weight, and iron between 0.5% by weight and 2% by weight.

Mentioned as examples of compositions selected for this purpose are:

TABLE 2

Examples of suitable liquid-phase-sinterable molybdenum alloys (selection).

| Mo content [% by weight] | Ni content [% by weight] | Cu content [% by weight] | Fe content [% by weight] |
|---|---|---|---|
| 90 | 6.66 | 1.67 | 1.67 |
| 90 | 4 | 5.1 | 0.9 |
| 90 | 3.34 | 6.0 | 0.66 |

On account of the density ratios, in these examples of liquid-phase-sinterable molybdenum alloys a binder phase content is approximately 12.5% by volume.

The examples mentioned here should not be understood to be limiting.

A particular advantage of the casting insert according to the invention is that the relatively expensive refractory metal alloy is primarily present in the casting insert only in locations where the chemical, mechanical and/or thermal assets of these alloys are depended upon. In particular, these are the sections of the casting insert wall which during use are exposed to a melt.

The economical advantage in using a molybdenum alloy is that this is cheaper on a volume basis than a tungsten-heavy metal alloy.

The at least one cooling duct can at least in sections be configured within the cavity and/or at least in sections be configured within the casting insert wall.

This means that firstly the variant is encompassed in which the at least one cooling duct is configured completely within the cavity. In addition, the at least one cooling duct can be configured entirely within the casting insert wall. Furthermore, the at least one cooling duct can run partially within the casting insert wall and partially in the cavity with a spacing from the casting insert wall.

Of course, two or more cooling ducts may also be provided, with the above-mentioned condition concerning the configuration at least in sections within the cavity and/or at least in sections within the casting insert wall applying at least for one cooling duct, and preferably for all cooling ducts.

A cooling duct configured at least in sections within the cavity means that the cooling duct at least in sections is spaced apart from the casting insert wall. The cooling duct is accordingly configured at least in sections essentially as a pipe comprising a cooling duct wall. In other words, the cooling duct here at least in sections has its "own" wall that differs from the casting insert wall. This form of the cooling duct can be produced particularly advantageously by an additive manufacturing process.

The cooling duct may also be configured at least in sections within the casting insert wall. This means that the cooling duct is also completely or partially surrounded by the casting insert wall. A wall of the cooling duct in this variant is formed at least partially by the wall of the casting insert. This describes the possibility of forming cooling ducts alternatively or additionally on the or in the casting insert wall. This means that cooling ducts may be configured, alternatively or additionally to a course with a spacing from the casting insert wall, to be integral with the casting insert wall.

This can for example achieve the arrangement of the cooling duct in sections particularly close to an outer surface of the casting insert.

This enables an advantageous dissipation of heat from the regions of the casting insert wall that are under particular thermal stress.

This form of a cooling duct can also be produced particularly advantageously by an additive manufacturing process. For example, in the case of a layer-by-layer construction of the casting insert, no material and/or a removable placeholder may be deposited at positions of a free conduit cross section of a later cooling duct.

In particular, there may be provision for a spacing of a cooling duct from an outer surface of the casting insert at a face side of the casting insert that faces the melt, that is to say at those regions that protrude further into the casting mold, to be less than in regions which protrude less far into the casting mold.

The at least one cooling duct is configured to conduct a cooling medium through the casting insert in a defined manner. The cooling medium is generally water or oil or an emulsion.

Unnecessary material accumulations are thus avoided. In addition, the configuration according to the invention enables a greater degree of freedom in the spatial arrangement of the cooling ducts, since these do not necessarily have to follow the casting insert wall.

Typically, the at least one cooling duct is configured so that a cooling medium that can be conducted therein can flow through the casting insert. There is therefore generally an inflow and an outflow section. The cooling medium is conducted into the casting insert via the inflow section, flows through the casting insert and leaves the casting insert via the outflow section. The profile of the cooling duct can in a simple case be roughly U-shaped and lie essentially in one plane.

A yet more intensive and uniform removal of heat is achieved when the cooling duct assumes a preferably at least partially spiral-shaped profile. It is also favorable if the cooling duct essentially follows an outer contour of the casting insert in a spiral-shaped manner, such that the cooling duct essentially runs with a uniform spacing from the outer contour. This contributes further to a homogeneous removal of heat.

There may be provision for the at least one cooling duct at least in sections to exhibit cross-sectional variations. For example, it is conceivable for a free flow cross-section of the cooling duct to narrow in sections or to vary in its cross-sectional shape. As a result, a heat transfer can be adapted to local requirements.

In the case of relatively low requirements for the heat output to be extracted or relatively small casting inserts, such as for example in the case of what are known as cooling fingers, it may be sufficient for the cooling duct to be realized merely in the form of a blind hole. In this case, no discrete inflow and outflow section is created, and instead a cooling medium must both enter and exit through the cooling duct realized as a blind hole. Cooling is in this case effected by what is known as impingement cooling at the base of the cooling duct.

There may preferably be provision for there to be configured a support structure connecting the casting insert wall and the at least one cooling duct. This describes the case according to which the at least one cooling duct is positioned with a spacing from the casting insert wall by a material connection, the support structure.

The support structure serves for mechanical stabilization and positioning of the cooling duct. This creates the possibility of configuring the cooling ducts to be slim and thin-walled and at the same time mechanically robust. The cavity between the cooling ducts and the wall of the casting insert is retained. This creates the possibility of filling the cavity between the cooling ducts and the wall of the casting insert with an additional material.

More preferably, there may be provision for the support structure to be configured in the form of discrete crosspieces and/or ribs.

This defines the preferred case in which a cooling duct is supported by a lattice-like configuration of the support structure in the form of discrete crosspieces and/or ribs.

The support structure may for example be configured as a three-dimensional framework.

It is favorable for the support structure to be designed to be so open that interstices between cooling ducts and casting insert wall remain fillable by a fill material. Filling with fill material may for example be effected by back-casting.

There is preferably provision for the support structure to be formed from the same material as the casting insert wall.

This describes the preferred case where the support structure and the casting insert wall consist of the same material.

In particular, the support structure transitions from the casting insert wall to the wall of the cooling duct in one piece.

More preferably, the cooling duct or the plurality of cooling ducts also consist of the same material as the casting insert wall.

In particular, the casting insert wall, support structure and cooling ducts consist of the same material, a liquid-phase-sintered refractory metal alloy.

As a result, for example, when additively manufacturing the casting insert no change of material is required during the construction. The casting insert wall, support structure and cooling ducts can advantageously be formed from the same material.

Preferably, the casting insert wall is produced via an additive manufacturing process, particularly preferably via a binder-based additive manufacturing process. This makes it possible for the generally complex shapes of the casting insert to be reproduced particularly advantageously. It is the route via an additive manufacturing process that is therefore solely advantageous for the production of the casting insert wall.

Additional advantages are gained when, in addition to the casting insert wall, the at least one cooling duct and optionally a support structure are also produced via an additive manufacturing process, particularly preferably via a binder-based additive manufacturing process. This enables simultaneous production of the structures. In addition, complex shapes can also be achieved favorably for the at least one cooling duct.

In the particularly preferred case, therefore, the casting insert wall, support structure and cooling ducts are produced in one piece via an additive manufacturing process, particularly preferably via a binder-based additive manufacturing process.

In the case of a layer-by-layer construction in additive manufacturing, regions of casting insert wall, support structure and cooling ducts can then be laid in a layer simultaneously. In this particularly preferred case, casting insert wall, support structure and cooling ducts materially transition into one another in a manner free of joining zones.

Alternatively to this, cooling ducts could be introduced separately into the cavity—for example in the form of preformed pipes.

There is preferably provision for the cavity between the casting insert wall and the at least one cooling duct to at least partially contain a filling formed of a fill material that differs from the material of the casting insert wall (the casting insert wall material).

This describes the preferred case where the casting insert is filled at least partially with a fill material that differs from the casting insert wall material. The filling is preferably back-cast. For example, the cavity is back-cast with copper or a copper alloy.

In particular, the fill material has a higher thermal conductivity than the wall material. This increases a heat output that can be removed via the casting insert.

It is advantageous that in the material composite thus created, the respective materials are used in accordance with their strengths: for instance the casting insert wall exposed to a melt is formed from a refractory metal alloy that is resistant to melts, while the filling may be provided from a material with a particularly high thermal conductivity.

The mechanical stabilization of the casting insert as a result of the filling is additionally favorable. The casting insert wall can have a relatively thin configuration, since it is supported on the inside by the filling. This also contributes to an advantageous utilization of material.

The fill material preferably has a thermal conductivity of at least 200 W/mK, more preferably of at least 300 W/mK, particularly preferably of at least W/mK.

Copper and copper alloys are particularly suitable as fill material since copper has a good compatibility with liquid-phase-sintered refractory metal alloys and a high thermal conductivity.

Because of the good compatibility with refractory metal alloys, an intimate bond between the casting insert wall and the filling and consequently good heat transfer arise.

It is particularly favorable if a diffusion zone is configured between the fill material and the refractory metal alloy.

The invention is directed in particular to casting inserts for use with light metal melts, including in particular aluminum melts.

There is particularly preferably provision for at least one section of the casting insert wall to be produced via an additive manufacturing process, in particular via a binder-based additive manufacturing process. This describes the particularly preferred case where the casting insert is produced at least in sections via an additive manufacturing process, particularly preferably via a binder-based additive manufacturing process. The term "binder-based" means that a metal powder used for the additive construction is treated with at least one organic binder constituent. Known binder-based additive manufacturing processes are in particular:

Filament printing with feedstock filaments, selective laser sintering (SLS) with feedstock granules/powder, lithographic processes with feedstock and binder jetting with mixed or pre-alloyed or granulated metal powders.

The structural features discussed can be achieved particularly advantageously via binder-based additive manufacturing processes. Advantages resulting from production via the additive manufacturing process include for example the absence of joining zones. In binder-based additive manufacturing processes, a green body is first produced which maintains its cohesion as a result of binder constituents. The metallic constituents are then metallurgically bonded by sintering.

For the material choice of the casting insert according to the invention, a liquid-phase-sintered refractory metal alloy, the production route via a binder-based additive manufacturing process is particularly advantageous, as will be explained in more detail below.

Particularly preferably, the casting insert wall and cooling ducts and optionally support structures are produced in one piece via the additive manufacturing process. In other words, the entire casting insert is preferably produced via the additive manufacturing process, in particular binder-based additive manufacturing process. In many cases, and economically advantageously, no mechanical finishing of surfaces is required.

In addition to the advantageous ability to produce complex geometries such as for example undercuts, there are also structural advantages to one-piece production, such as a continuous material bond between the elements of casting insert wall, cooling ducts and optionally support structures. The one-piece nature contributes to favorable heat removal and mechanical stability.

The production of the casting insert via an additive manufacturing process is apparent to a person skilled in the art. In particular, there are microstructural and/or macroscopic differences between additively constructed and conventionally produced components. For example, a person skilled in the art identifies the production route on unprocessed outer regions or on inner walls by what are known as the layer lines or increased roughnesses. These structures may also be amplified in a controlled manner, for example in order to modify an inner wall of a cooling duct in terms of flow.

In addition to microstructural differences, there is of course the distinguishing feature concerning the complexity and/or the thin-walled nature of the structures that can be produced.

In addition, in the process of sinter joining from the prior art, defects are generally present in the joining zone.

Protection is also sought for a method for producing a casting insert. It is a binder-based additive manufacturing method. Examples of binder-based additive manufacturing methods are in particular filament printing with feedstock filaments, selective laser sintering (SLS) with feedstock granules or powder, lithographic processes with feedstock or binder jetting with mixed or pre-alloyed or granulated metal powders.

The method according to the invention comprises the steps of:
- providing a powder of a liquid-phase-sinterable refractory metal alloy and at least one organic binder constituent,
- producing a green body by additively constructing at least one section of a casting insert wall from the powder treated with at least one organic binder constituent,
- debindering the green body produced in this way to obtain a brown body,
- sintering the brown body in the at least temporary presence of liquid phase to give a metallic blank of a casting insert,
- optionally performing finishing of the blank to obtain the casting insert.

Firstly, a powder of a liquid-phase-sinterable refractory metal alloy and at least one organic binder constituent is provided. Providing may mean that the metal powder is processed with the at least one organic binder constituent into a plastified mass.

This mass is for example obtained by intimate mechanical mixing and kneading and/or extruding and/or granulating and/or milling. The plastified mass can be brought into various administration forms. For filament printing, feedstock filaments are produced; for selective laser sintering (SLS), feedstock granules or feedstock powder is/are provided; for lithographic processes, typically a feedstock block is used.

Alternatively—for the case of binder jetting—the organic binder constituent is applied to the metal powder in situ, that is to say during the layer-by-layer construction.

The liquid-phase-sinterable refractory metal alloy can be introduced as a pre-alloyed powder or as a mixture of elemental powders or as a mixture of pre-alloys.

Compositions proposed in particular are the following: Tungsten-heavy metal alloys comprising tungsten with one or more elements from the group nickel, iron, copper, molybdenum, and also liquid-phase-sinterable molybdenum-based alloys comprising molybdenum with one or more elements from the group nickel, iron, copper, tungsten.

The additive manufacturing process results in layer-by-layer production of a green body forming the casting insert wall. The casting insert wall thus produced at least partially forms a later outer contour of the green body.

What is particularly advantageous with production via the additive manufacturing process is that complex external and/or internal geometries can be produced which can be produced only with great effort, if at all, via conventional manufacturing processes. Cooling ducts can advantageously be produced for example by leaving out material in the casting insert wall or else by forming closed cross sections within the cavity.

The additive construction is for example effected by filament printing with feedstock filaments, SLS with feedstock granules/powder, lithographic processes with feedstock or binder jetting with mixed or pre-alloyed or granulated metal powders.

The applicant's experiments have shown that binder-based additive manufacturing processes are particularly suitable for the use of liquid-phase-sinterable refractory metal alloys.

The laser or electron beam fusion processes that are customary for weldable materials such as for example steel are unfavorable for composite materials such as liquid-phase-sinterable refractory metal alloys. The locally high input of heat of a high-energy beam can for example already vaporize the low-melting phase, while the melting point of the higher-melting phase is far from being reached.

Another feature of the binder-based additive manufacturing process is that a green body exists after the layer-by-layer construction. The green body contains the metal powder and also the at least one organic binder constituent. In general, two or more binder constituents are used. Particularly advantageous is a composition comprising a thermoplastic polymer and at least one plasticizer. In general, additives are also added, for example as lubricant or in order to adjust a viscosity.

The thermoplastic polymer is selected in particular from the group of polyurethane, polyamide, polyvinylpyrrolidone, polyacrylate, polyolefin or a mixture thereof.

The plasticizer can in particular be an ester or a mixture of esters.

Suitable, commercially available binder compositions are disclosed for instance in European patent specification EP 3 167 101 (B1).

The green body is mechanically robust and can for example be easily processed. This is a further advantage of the binder-based route.

The debindering is effected chemically, chemically/thermally or solely thermally. The debindering removes those organic constituents that predominantly serve for adjusting the rheology and processability.

A polymeric "backbone" between powder grains remains and imparts sufficient mechanical stability for handling upon the brown body obtained as a result of the debindering. A further advantage of the debindering is that a reduced organic load is encountered in the sintering step. In the case of the above-mentioned example of polyamide, debindering is preferably effected chemically, for example with acetone. Bridges of polyamide between metal grains remain. The body present after the debindering is referred to as the brown body.

The brown body is then sintered in the at least temporary presence of liquid phase to give a metallic blank of a casting insert.

Sintering in the at least temporary presence of liquid phase can mean that, using the example of MoCu or WCu alloys, the low-melting element (here Cu) is present as melt and wets and ultimately bonds the higher-melting powder particles (here Mo or W).

It can also mean that as a result of thermally induced processes low-melting phases form with partial incipient dissolution of the Mo or W particles. The latter process is referred to in the literature as true liquid-phase sintering. The known tungsten-heavy metal alloys for example function by this mechanism.

In connection with this invention, both processes are to be understood as sintering in the at least temporary presence of liquid phase.

Depending on whether a finished component in terms of the final dimensions is already obtained after the sintering, or whether dimensional changes are still to be made, reference is made to net-shape or near-net-shape manufacturing.

The optional finishing of the blank for example comprises a mechanical reworking, or a surface processing, or a jet blasting, or a trimming.

However, the need for finishing may be entirely absent. In this case, the blank obtained with the step prior to the optional finishing is already the finished casting insert.

The method enables the production of a casting insert with complex internal 3-dimensionally extending cooling ducts, where material is expended only in those regions in which material is required later in the application.

The casting insert wall is particularly preferably produced in such a way that the casting insert wall has a wall thickness which at least in sections is less than 25%, in particular less than 20%, of a diameter of the casting insert. As explained further above, this feature describes a thin-walled nature of the casting insert. The statements regarding the thin-walled nature of the casting insert also apply for this section relating to the method.

The configuration of a thin-walled casting insert is particularly advantageous via the additive manufacturing process, since, unlike with machining manufacture, only the material actually required for the final form needs to be used.

According to a variant, a separately provided cooling duct is metallurgically joined to the casting insert thus produced. In particular, a suitably formed steel pipe may for example be inserted into the sintered casting insert and for example bonded with the casting insert wall by back-casting with a fill material. By way of this variant, casting inserts with simple geometries can be produced cost-effectively.

Preferably, however, at least one cooling duct is also produced via the additive manufacturing process simultaneously with the production of the casting insert wall. The at least one cooling duct is thus configured integrally with the casting insert wall.

A support structure connecting the casting insert wall and the at least one cooling duct may also be produced at the same time. This is particularly relevant for the case where the at least one cooling duct is intended to be configured at least in sections to be at a spacing from the casting insert wall. The support structure ensures a positioning and mechanical stabilization of the cooling duct running in this manner.

It is advantageous in particular to produce the casting insert wall, cooling ducts and optionally support structures simultaneously. In this way the advantages of the additive manufacturing process are exploited particularly advantageously.

In a further development, the cavity may be at least partially filled with a fill material that differs from the material of the casting insert wall, as already discussed above in more detail.

PRODUCTION EXAMPLE

The metal powder used was DENSIMET® D185 powder.

The metal powder had a nominal chemical composition of 97% by weight of tungsten, 2% by weight of nickel and 1% by weight of iron.

The $d_{50}$ particle size was between 6-8 µm.

The powder was processed with a thermoplastic binder based on polyamide with a plasticizer and also additives to form a feedstock filament. The degree of filling was around 55% by volume. Binders based on polyamide have proven to be particularly advantageous for application with refractory metals.

The polyamide ensures favorable thermoplastic processability of the feedstock, the plasticizer moderates the rheological properties. The additives serve for lubrication and adaptation of the viscosity.

A green body is constructed layer-by-layer using the feedstock filament on a filament printer.

The green body thus produced was then chemically debindered in acetone.

The brown body thus obtained was sintered at around 1550° C. under an H2 atmosphere to give the finished casting insert.

Lastly, the casting insert was back-cast with copper.

The filling of the casting insert with a fill material is a preferred embodiment.

Further advantages and utilities of the invention emerge from the following description of exemplary embodiments with reference to the attached figures.

BRIEF DESCRIPTION OF THE FIGURES

FIG. 8a-8c show scanning electron microscope (SEM) images of surfaces at 50-fold magnification FIG. 9a-9c show scanning electron microscope (SEM) images of surfaces at 100-fold magnification FIG. 10a-10c show scanning electron microscope (SEM) images of surfaces at 250-fold magnification FIG. 11a-11b show respective cross sections of a ground surface and an unprocessed sintered surface of a body formed from tungsten-heavy metal

DETAILED DESCRIPTION OF THE INVENTION

Figure 1:
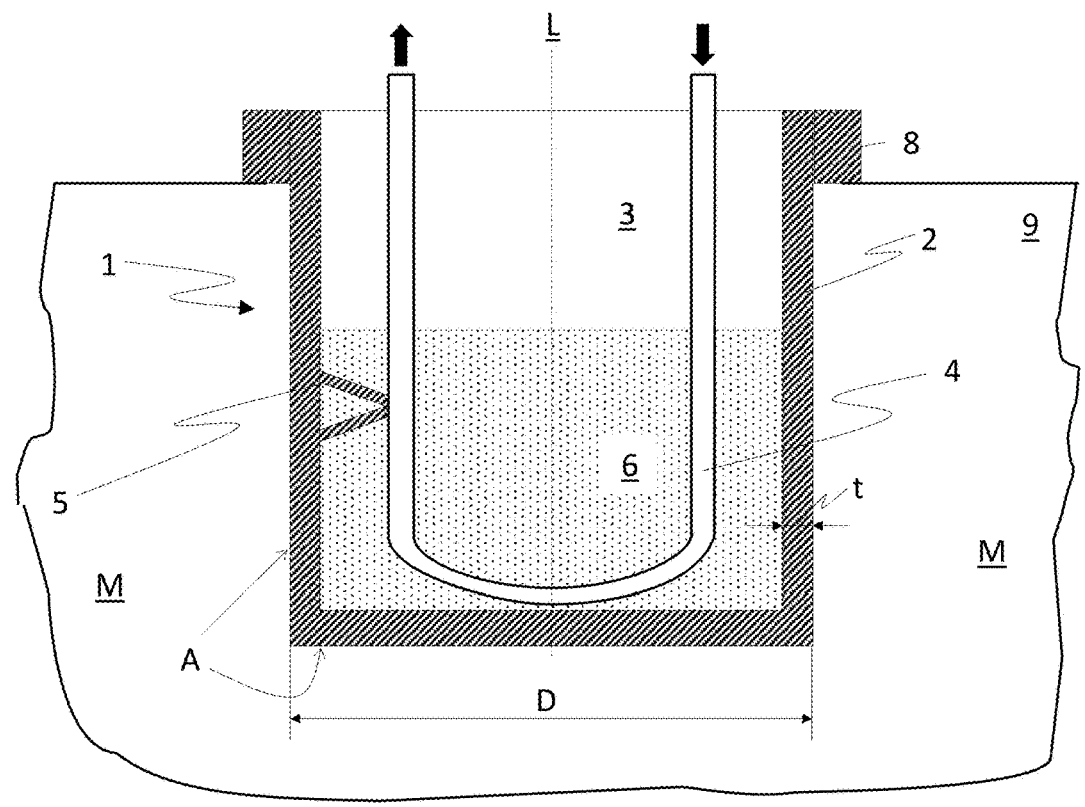
FIG. 1: shows a casting insert according to a first exemplary embodiment.

FIG. 1 schematically shows a casting insert in cross section according to a first exemplary embodiment.

The casting insert 1 comprises a casting insert wall 2 formed by a liquid-phase-sintered refractory metal alloy, this wall forming a kind of shell and enclosing a cavity 3. Configured within this volume circumscribed by the casting insert wall 2—the cavity 3—is a cooling duct 4. The cooling duct 4 is thus a different unit from the cavity 3.

The cooling duct 4 is a conducting device for a cooling medium. The term "cooling duct" in connection with this application designates, depending on the case, the free conduit cross section of the conducting device for the cooling medium (in the case of a course within the casting insert wall 2) or the entire physical conducting device, that is to say the cooling duct wall thereof with a wall thickness together with the conduit cross section delimited by the cooling duct wall.

The cooling duct 4 is in this exemplary embodiment configured as a tubular conducting device. Block arrows indicate an inflow direction and an outflow direction of a cooling medium. Of course, two or more cooling ducts 4 may also be configured. The at least one cooling duct 4 may protrude from the cavity 3, as illustrated in the present example, or terminate flush with an open side of the casting insert 1.

The free conduit cross section of the cooling duct 4 is formed here by a wall of the cooling duct 4, compared to exemplary embodiments in which the cooling duct 4 runs at least in sections in the casting insert wall 2. In the latter case, the free conduit cross section is configured at least partially in the casting insert wall 2.

The cooling duct 4 is in this example retained by a support structure 5 and connected via the latter to the casting insert wall 2. The support structure 5 is preferably in the form of a lattice structure comprising crosspieces and/or ribs.

The support structure 5 has the task of holding and stabilizing the cooling duct in the desired position. It is advantageous for the support structure 5 to be of open design such that the support structure 5, more precisely the network of hollow spaces formed by the support structure 5, can be fully infiltrated.

In this exemplary embodiment, the optional, preferred variant is illustrated, according to which the casting insert 1 is filled at least partially with a filling 6 of a fill material that differs from the casting insert wall material. The filling 6 consists in particular of a material having a higher thermal conductivity than that of the casting insert wall material. Of particular suitability is a filling 6 formed of copper or of a copper alloy. The filling 6 can in this case be easily produced by back-casting.

The casting insert 1 is particularly preferably monolithic, i.e. one-piece. That means that the casting insert wall 2, the cooling duct 4 and the support structure 5 materially transition into one another. The casting insert wall 2, cooling duct 4 and support structure 5 are in particular formed from the same material, the casting insert wall material, and have been produced together in an additive manufacturing process.

In particular, the casting insert 1 has been produced via the method of filament printing (fused deposition modeling or fused filament fabrication) of a feedstock filament. The method enables the production of complex component geometries with hollow spaces and undercuts. Binder-based additive manufacturing processes are particularly advantageous for liquid-phase-sinterable refractory metal alloys.

When the casting insert 1 is in use, the casting insert protrudes into a casting mold 9 (not illustrated here in more detail). Optionally, a shoulder or a flange 8 may be formed on the casting insert 1, in order to create a bearing surface, sealing surface and/or mounting possibility for the casting mold 9. Preferably, the shoulder or flange 8 has been configured from the casting insert wall material in one piece with the casting insert 1.

In a use, the casting insert 1 is exposed to a melt M at an outer surface A. A surface of the casting insert 1 thus generally represents an outer contour of a workpiece. By way of the casting insert 1, heat can be extracted from a melt M located in the casting mold 9 in an intensified fashion. By way of this, properties of a component produced in the casting mold 9 can be influenced in a positive manner. Particularly favorable is a near-net-surface-shape profile of the cooling ducts 4. As a result of a variable spacing of the cooling duct 4 from the outer surface A of the casting insert 1, a local cooling action can be influenced.

There may be provision, in a region of the casting insert 1 that protrudes far into the casting mold 9 in use, in other words in a region averted from the inlet of the cooling medium, for a spacing of the cooling duct 4 from the outer surface A to be less than in a region close to the inlet of the cooling medium.

It is also possible in a particularly elegant fashion, via the discussed additive manufacturing process, to configure cross-sectional variations in cooling ducts 4, in order thus to influence the heat transfer.

The casting insert 1 shown here is cylindrical. Any other desired shapes are also producible. The casting insert 1 has a diameter D and a wall thickness t of the casting insert wall 2. The casting insert 1 has a thin-walled configuration. In the present example, the wall thickness t is approximately $1/12$ of the diameter D, i.e. around 8%.

The wall thickness t is definable as a normal distance between a point of the casting insert wall 2 facing the cavity 3 and a point on an outer surface A of the casting insert wall 2.

There is provision in accordance with the invention for the wall thickness t to be at least in sections less than 25% of a diameter D of the casting insert 1.

It is preferable for the casting insert 1 of the invention for the wall thickness t to be on average less than 25% of the diameter D. More preferably, the wall thickness t is on average less than 20%, more preferably less than 10%, of the diameter D. For evaluation of the wall thickness t, those sections of the casting insert wall 2 are considered that protrude into a casting mold in use. Sections that predominantly serve a fastening purpose, such as a shoulder 8, are not to be counted.

The thin-walled nature means that casting insert wall material, the refractory metal alloy, can be saved. Besides economic considerations, this can also be advantageous for, in the case of the variant with a filling 6, accommodating more of the fill material and disposing the latter particularly close to an outer surface A of the casting insert 1 that is exposed to the melt. A thin-walled nature can also be advantageous for the case in which the casting insert 1 is intended to exhibit, in whole or in sections, a low thermal mass. It may for example be desired for the casting insert 1 to have a minimal thermal inertia, for example in the case of short cycle times.

This may advantageously be achieved by configuring the casting insert 1 to be thin-walled and/or at least partially hollow. The phrase "at least partially hollow" means that the casting insert 1 at least in part does not contain material filling. This can be achieved advantageously and in a defined manner via the additive manufacturing process.

In the case of deviation from a cylindrical basic shape, equivalent characteristic variables to the wall thickness t and diameter D can be defined for classifying the thin-walled nature.

To define a characteristic wall thickness t, use is made of an average of wall thicknesses of the casting insert wall 2 of those regions that are actually exposed to a melt when the casting insert 1 is being used.

A characteristic diameter D can be defined by a diameter of a smallest enclosing cylinder that surrounds that section of the casting insert 1 that is actually exposed to a melt when the casting insert 1 is being used. The ratio of wall thickness t to diameter D can therefore also be specified for shapes of the casting insert 1 that deviate from a cylinder.

It should be reiterated that a thin-walled nature does not mean that the casting insert 1 needs to be hollow. It may contain a filling 6 throughout. Rather, a thin-walled nature means that the casting insert wall 2 formed from refractory metal alloy is only as thick as is required for leak-tightness and resistance to the melt in question.

Figure 2:
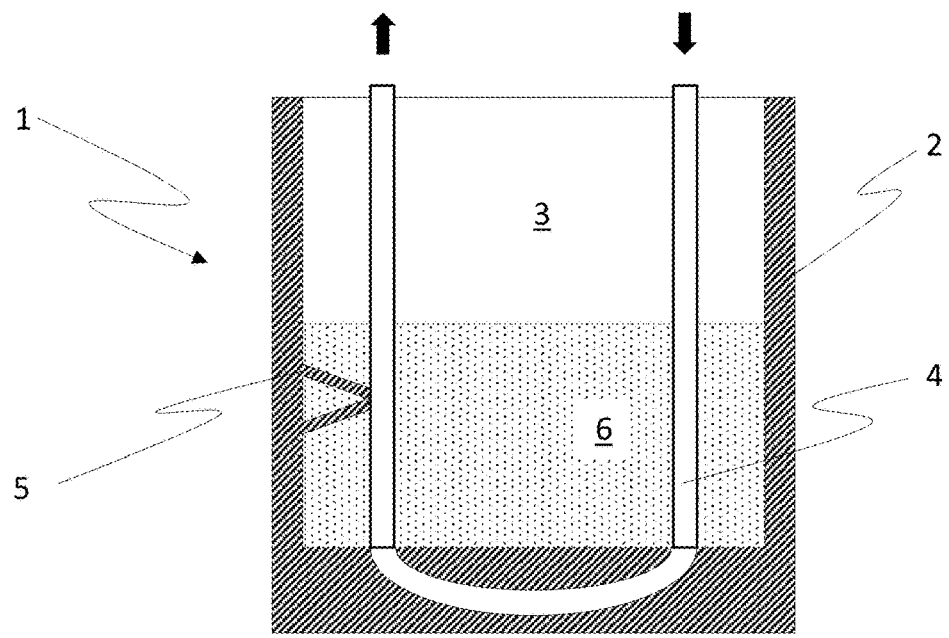
FIG. 2: shows a casting insert according to a further exemplary embodiment.

FIG. 2 shows a further exemplary embodiment of a casting insert 1 in cross section. The reference signs are assigned as in FIG. 1 and are therefore not explained again.

The exemplary embodiment shown here differs, inter alia, in that the cooling duct 4 runs in sections in the casting insert wall 2.

The cooling duct 4 can as a result be guided in a particularly near-net-surface-shape manner. This measure, which is also referred to as "conformal cooling", promotes a homogeneous removal of heat via the casting insert 1.

Figure 3:
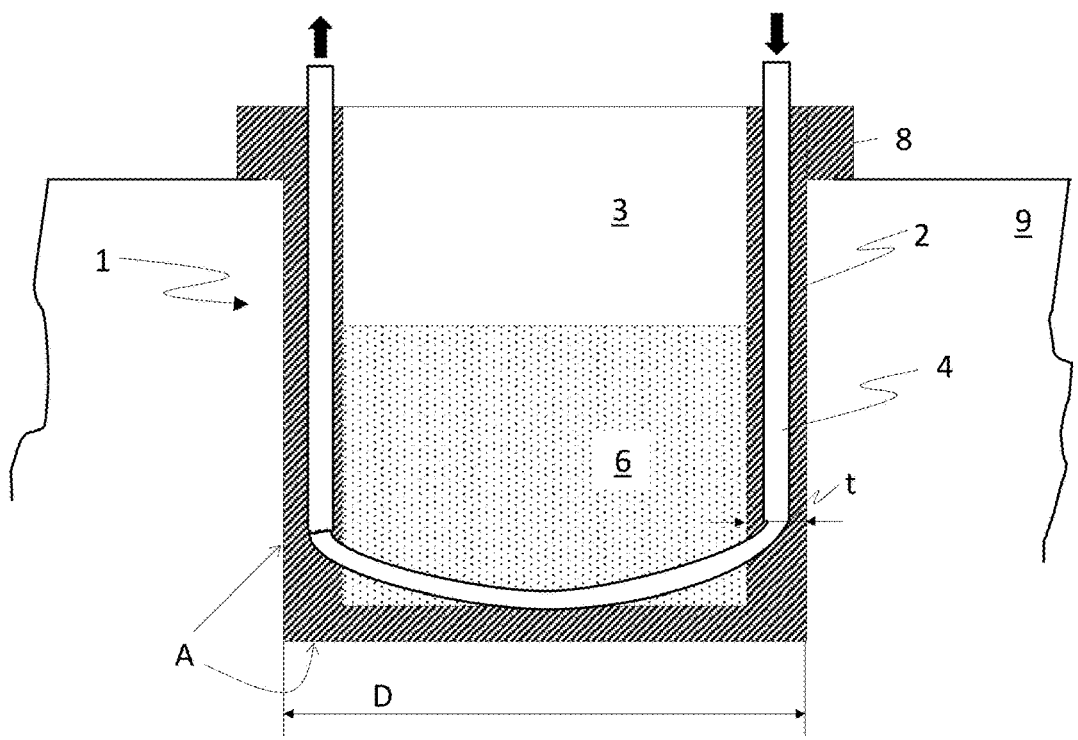
FIG. 3: shows a casting insert according to a further exemplary embodiment.

FIG. 3 shows a further exemplary embodiment of a casting insert 1 in cross section. Here, in contrast to the example of FIG. 2, no support structure 5 is configured and instead the cooling duct 4 is configured partially within the casting insert wall 2 and runs in sections within the cavity 3.

The cooling duct 4 here is configured in one piece with the casting insert wall 2. The optional filling 6 is also shown in this example.

Figure 4:
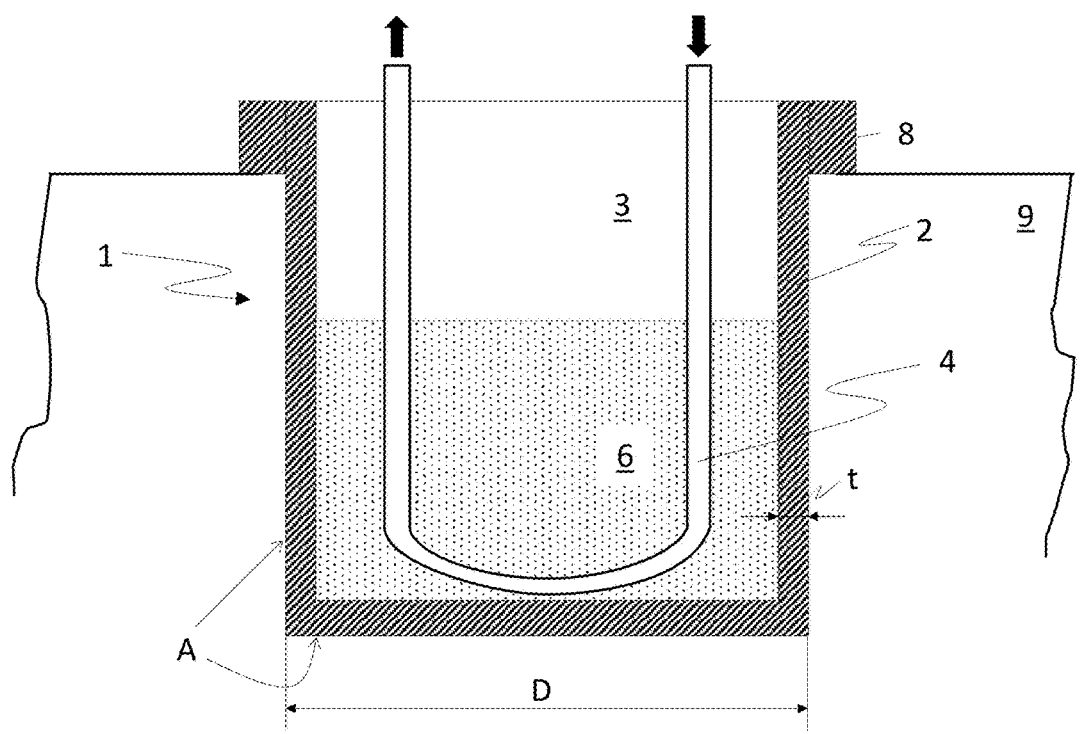
FIG. 4: shows a casting insert according to a further exemplary embodiment.

FIG. 4 shows a further exemplary embodiment of a casting insert 1 in cross section. Here, the cooling duct 4 runs within the cavity 3 without support structure 5. The cooling duct 4 may also be produced separately from the casting insert wall 2.

It is conceivable to provide the cooling duct 4 for example as a pipe and to connect it to the casting insert wall 2 via suitable means and/or a filling 6. The cooling duct 4 here is thus not configured in one piece with the casting insert wall 2.

As explained further above, however, preference is given to a one-piece production of the casting insert wall 2 with the at least one cooling duct 4 via an additive manufacturing process.

Figure 5A:
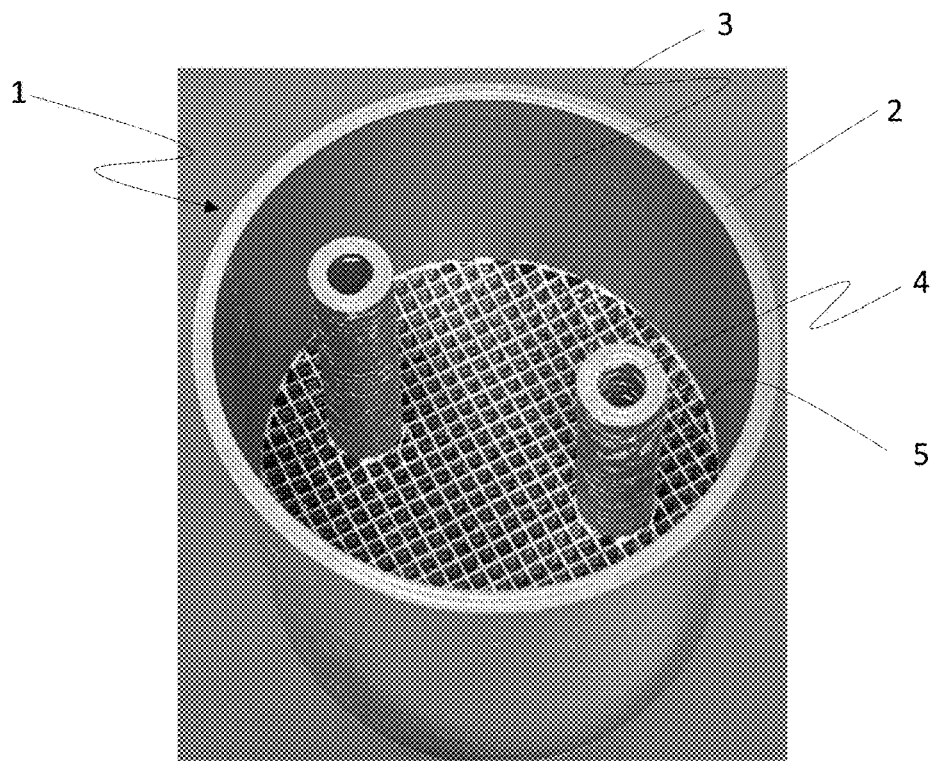
FIG. 5a-5b: show photos of a casting insert (specimen component)

FIG. 5a shows a photograph of a casting insert 1 in the form of a specimen component. The viewing direction is directed onto inlet and outlet openings of the cooling duct 4. In the interior of the casting insert 1, lattice-like support structures 5 configured in the cavity 3 can be seen, these positioning the cooling duct 4. The casting insert 1 was produced via filament printing with feedstock filaments formed from a tungsten-heavy metal alloy. The casting insert wall 2, the support structures 5 and the cooling duct 4 are accordingly of one-piece configuration.

Figure 5B:
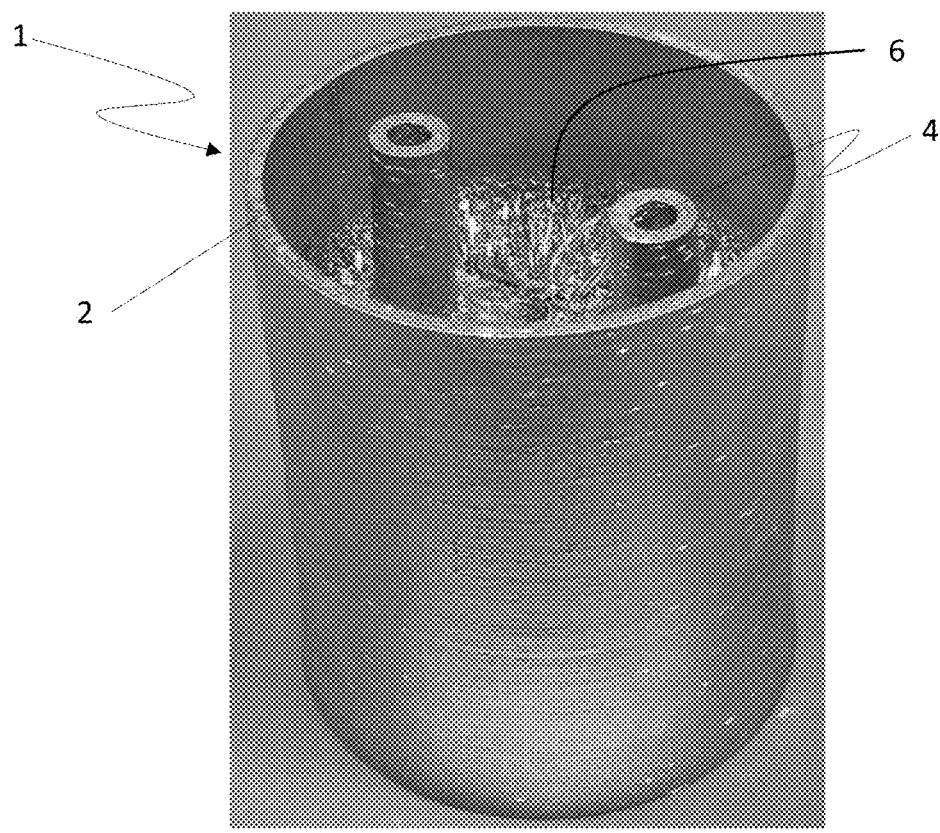

FIG. 5b shows a photograph of the casting insert 1 of FIG. 5a, in which here a majority of the cavity 3 contains a filling 6 of a fill material that differs from the material of the casting insert wall 2. The filling 6 consists here of copper, which has been introduced into the casting insert 1 via back-casting. This variant has particularly favorable properties in terms of the achievable heat removal. In addition, the filling 6 also forms a mechanical support for the cooling ducts 4 and the thin-walled casting insert wall 2.

Figures 6A, 6B:
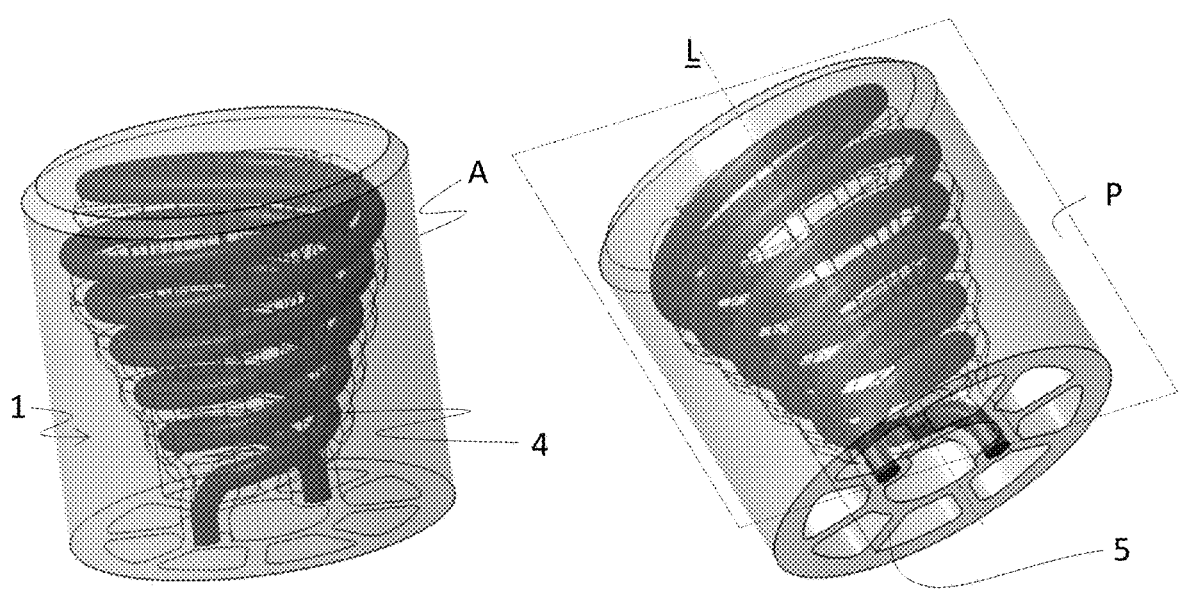
FIG. 6a-6c show schematic illustrations of a casting insert
Figure 6C:
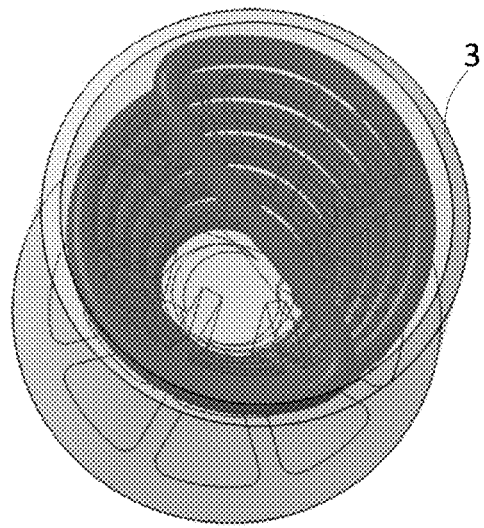

FIGS. 6a to 6c show perspective illustrations of a casting insert 1 in various views, in each case with semi-transparent visualization. The cooling duct 4 runs in a spiral-shaped manner, with a spacing of the cooling duct 4 from an outer surface A of the casting insert 1 decreasing as the distance from a region of an inlet for a cooling medium increases (in FIG. 6a this region corresponds to the lower edge of the image). In other words, the cooling duct runs, in a section of the casting insert 1 that during use of the casting insert protrudes further into a casting mold 9 (not illustrated here), closer to the outer surface A than in the region of the inlet for the cooling medium.

FIG. 6b shows the casting insert 1 in another viewing direction. The support structure 5 configured in the form of ribs can be seen. Also sketched is a sectional plane P, the plane normal of which runs perpendicularly to a longitudinal axis L of the casting insert 1 and which contains the longitudinal axis L.

FIG. 6c shows the casting insert 1, with a viewing direction onto that face side of the casting insert 1 that in use protrudes into a casting mold (not illustrated here). The thin-walled configuration of the casting insert wall 3 can be seen in the illustration.

Figures 7A, 7B, 7C:
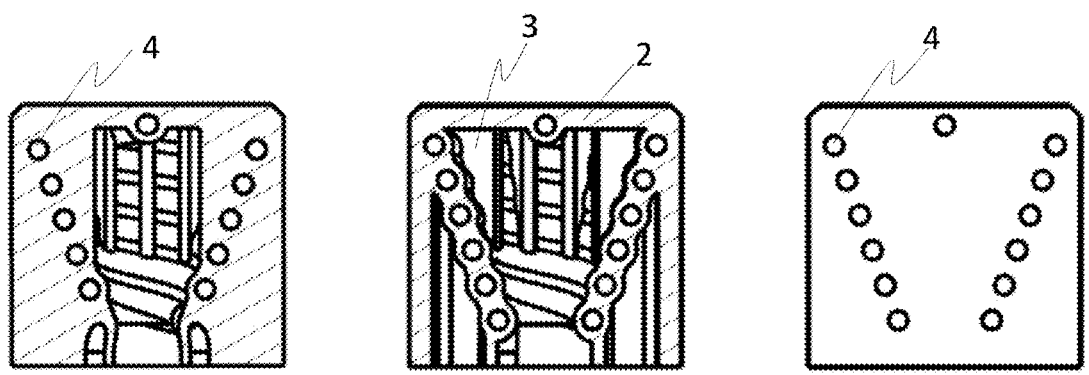
FIG. 7a-7c show sectional illustrations of a casting insert

FIGS. 7a to 7c show schematic longitudinal cross sections through the casting insert 1 illustrated in FIGS. 6a to 6c, which longitudinal cross sections are produced by rotating the sectional plane P about the longitudinal axis L.

In FIG. 7a the sectional plane P is positioned so as to run through the support structure 5.

In FIG. 7b, the sectional plane is positioned so as to run between support structures 5, as a result of which the cavity 3 formed by the casting insert wall can be seen.

FIG. 7c schematically shows the profile of the cooling duct 4 (no cross-sectional illustration).

FIGS. 8a-8c, 9a-9c, and 10a-10c show scanning electron microscope images of various surfaces of tungsten-heavy metal specimens. Each series is taken with the same magnification.

In the first column (FIGS. 8a, 9a, 10a), ground surfaces of tungsten-heavy metal are shown with increasing magnification. These surfaces can for example be observed in conventionally produced casting inserts.

In the second column (FIGS. 8b, 9b, 10b), surfaces of tungsten-heavy metal are illustrated with increasing magnification, produced via selective laser sintering (SLS) of feedstock granules. The surfaces are as sintered. A slightly hilly characteristic of the surface can be seen, originating from the grains of the feedstock granules.

In the third column (FIGS. 8c, 9c, 10c), surfaces of tungsten-heavy metal are illustrated with increasing magnification, produced via filament printing with feedstock filaments.

The surfaces are as sintered. A slightly wavy characteristic of the surface can be seen, originating from the deposited feedstock filaments.

FIGS. 8b, 9b, 10b and 8c, 9c, 10c thus show surfaces as can be observed on an unprocessed casting insert 1 produced in accordance with the invention.

A person skilled in the art on the basis of the surface characteristic of as-sintered surfaces obtains indications of the production method.

In particular, a conclusion regarding the production route is possible at those sections of the casting insert 1 according to the invention that have not undergone any subsequent surface processing.

FIG. 11a shows a cross section of a ground surface of a body formed from tungsten-heavy metal. The cut tungsten grains in a matrix of metallic binder phase can be seen. By way of example, cut grains are identified with block arrows.

FIG. 11b shows a cross section of an unprocessed sinter surface of a body formed from tungsten-heavy metal. Coalesced, flattened tungsten grains in a matrix of metallic binder phase can be seen.

Surfaces without cut grains as illustrated in FIG. 11b can be observed on a casting insert 1 produced according to the invention, provided that no subsequent processing is carried out.

Figure 12:
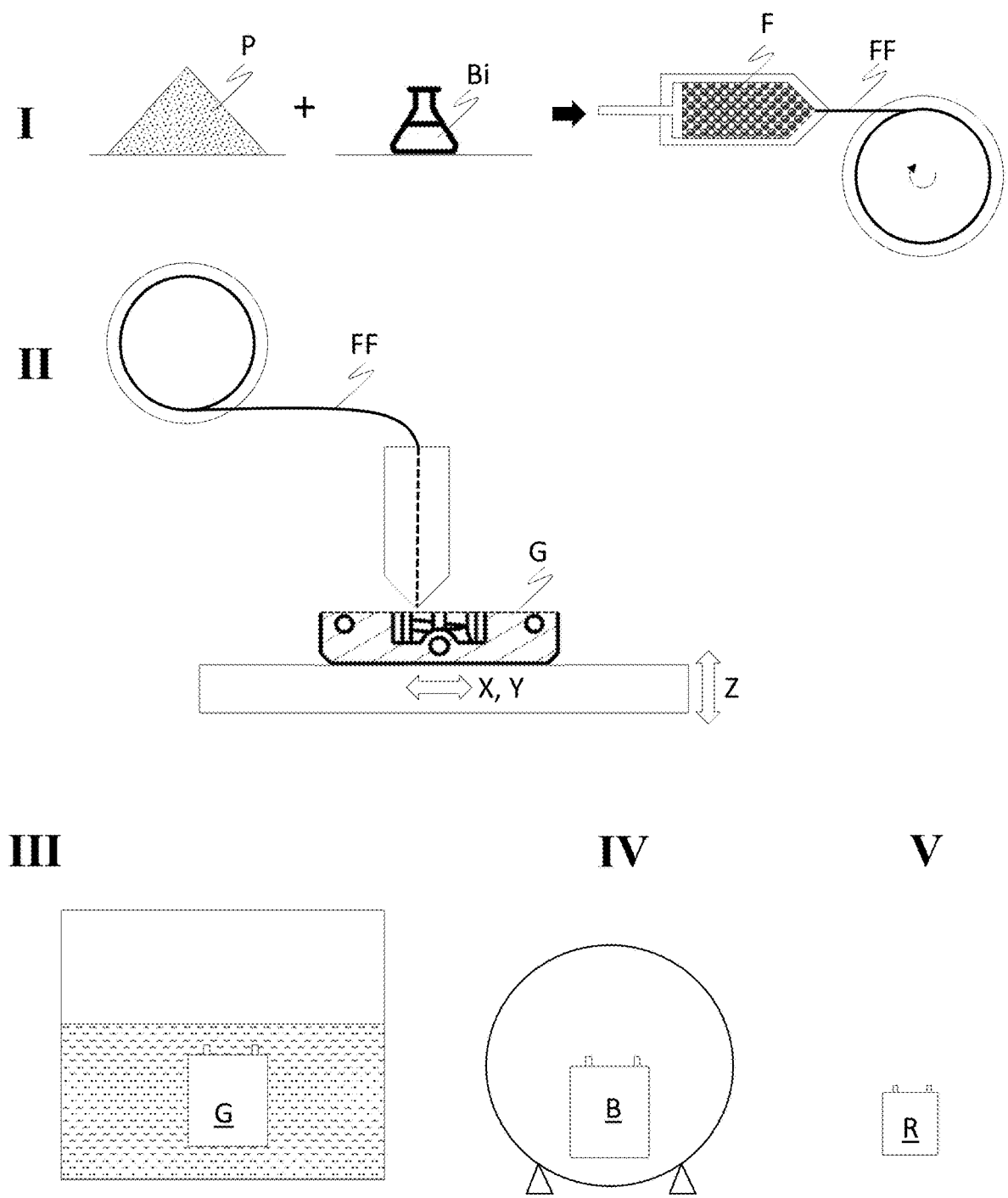
FIG. 12 shows a method sequence for producing a casting insert.

FIG. 12 schematically shows the method sequence for producing a casting insert 1 according to the variant of filament printing with feedstock filaments.

Here, in a first step (I) metal powder—P—of a liquid-phase-sinterable refractory metal alloy is processed with a binder—Bi—and also further organic constituents to give a plastically processable feedstock F and further processed to give a feedstock filament—FF.

A feedstock filament is a thin thread, usually produced by extrusion, formed from the feedstock mass, which is usually flexible and for example can be wound onto a spool.

In a following step (II), the feedstock filament is extruded through a heatable nozzle onto a movable table. The (filament) printing process takes place layer-by-layer according to a previously generated layer model to form the green body to be produced—G—and is conducted such that the feedstock tracks applied fuse with one another.

The green body produced, of the later casting insert 1, is overscaled in the X, Y and Z direction by the shrinkage factors expected during the sintering and any necessary finishing measures.

A green body—G—of the later casting insert 1 is obtained.

In a debindering step (III), the majority of the organic binder is removed. A chemical debindering is shown here. Alternatively, thermal or catalytic debindering is also possible.

The brown body—B—thus obtained is then sintered in the at least temporary presence of liquid phase, step IV.

A metallic blank—R—of the casting insert 1 is obtained, step V.

Finishing may optionally be effected.

The invention claimed is:

1. A casting insert, comprising:
    a casting insert wall having an outer surface, said casting insert wall formed at least partially from a liquid-phase-sintered refractory metal alloy;
    said casting insert wall forming a cavity; said cavity being on a side of said casting insert that does not face a molten metal
    at least one cooling duct being different from said cavity, said at least one cooling duct being at least one of configured at least in sections within said cavity or configured at least in sections within said casting insert wall;
    said casting insert wall having a wall thickness, said wall thickness being definable as a normal distance between a point of said casting insert wall facing said cavity and a point on said outer surface of said casting insert wall, and said wall thickness, at least in sections, being less than 25% of a diameter of the casting insert.

2. The casting insert according to claim 1, which further comprises a support structure interconnecting said casting insert wall and said at least one cooling duct.

3. The casting insert according to claim 2, wherein said support structure is configured as at least one of discrete crosspieces or discrete ribs.

4. The casting insert according to claim 2, wherein said support structure and said casting insert wall are formed of the same material.

5. The casting insert according to claim 1, wherein said at least one cooling duct and said casting insert wall are formed of the same material.

6. The casting insert according to claim 1, wherein said at least one cooling duct has a spiral-shaped profile at least in sections.

7. The casting insert according to claim 1, wherein said at least one cooling duct has cross-sectional variations at least in sections.

8. The casting insert according to claim 1, which further comprises a filling formed of a fill material differing from a material of said casting insert wall, said cavity between said casting insert wall and said at least one cooling duct at least partially containing said filling.

9. The casting insert according to claim 8, wherein said fill material is selected from the group including copper and copper alloys.

10. The casting insert according to claim 1, wherein said casting insert wall has at least one section having characteristics of having been produced by an additive manufacturing process.

11. The casting insert according to claim 1, wherein said casting insert wall and said at least one cooling duct have characteristics of having been produced in one piece by an additive manufacturing process.

12. A method for producing a casting insert, the method comprising steps of:
    producing the casting insert according to claim 1 by:
        providing a powder of a liquid-phase-sinterable refractory metal alloy and at least one organic binder constituent;
        producing a green body by additively constructing at least one section of the casting insert wall from the powder treated with the at least one organic binder constituent;
        debindering the produced green body to obtain a brown body;
        sintering the brown body in an at least temporary presence of liquid phase to yield a metallic blank of the casting insert; and
        optionally performing finishing of the blank to obtain the casting insert.

13. The method according to claim 12, which further comprises producing at least one section of the at least one cooling duct by additive construction, simultaneously with the construction of the at least one section of the casting insert wall.

14. The method according to claim 12, which further comprises simultaneously producing a support structure interconnecting the casting insert wall and the at least one cooling duct at least in sections, by additive construction.

15. The method according to claim 12, which further comprises at least partially filling the cavity with a fill material differing from a material of the casting insert wall.

* * * * *